US008989997B2

(12) United States Patent
Miwa (10) Patent No.: US 8,989,997 B2
(45) Date of Patent: Mar. 24, 2015

(54) MAP DISPLAY SYSTEM, METHOD, AND PROGRAM

(75) Inventor: Daisuke Miwa, Okazaki (JP)

(73) Assignee: Aisin AW Co., Ltd., Aichi-ken (JP)

( * ) Notice: Subject to any disclaimer, the term of this patent is extended or adjusted under 35 U.S.C. 154(b) by 323 days.

(21) Appl. No.: 13/536,228

(22) Filed: Jun. 28, 2012

(65) Prior Publication Data

US 2013/0018571 A1  Jan. 17, 2013

(30) Foreign Application Priority Data

Jul. 13, 2011  (JP) ................................. 2011-155129

(51) Int. Cl.
*G06F 19/00* (2011.01)
*G06G 7/70* (2006.01)
*G08G 1/123* (2006.01)
*G01C 21/36* (2006.01)

(52) U.S. Cl.
CPC .......... *G01C 21/367* (2013.01); *G01C 21/3694* (2013.01)
USPC ..................................... 701/118; 340/995.27

(58) Field of Classification Search
CPC ............. G01C 21/367; G01C 21/3694; G01C 1/3667; G01C 1/3676; G01C 1/3691
USPC ......... 701/117–119, 409, 414, 423, 431, 429, 701/446, 451, 457, 458; 340/933–934, 340/995.13–995.14, 995.19, 995.27
See application file for complete search history.

(56) References Cited

U.S. PATENT DOCUMENTS

| 5,583,494 | A  | * | 12/1996 | Mizutani et al. ......... 340/995.14 |
|---|---|---|---|---|
| 6,922,629 | B2 |   | 7/2005  | Yoshikawa et al. |
| 2005/0043880 | A1 | * | 2/2005 | Yamane et al. ............... 701/200 |
| 2005/0182560 | A1 | * | 8/2005 | Cochlovius et al. .......... 701/208 |
| 2012/0150436 | A1 | * | 6/2012 | Rossano et al. ............... 701/450 |

FOREIGN PATENT DOCUMENTS

| JP | 09-288796 A | 11/1997 |
|---|---|---|
| JP | 10-227653 A | 8/1998 |
| JP | 2001-264100 A | 9/2001 |
| JP | 2004286489 A | * 10/2004 ............. G01C 21/00 |
| JP | 2005-147792 A | 6/2005 |
| WO | 03/014671 A1 | 2/2003 |

OTHER PUBLICATIONS

Machine Translation of Murata JP document.*

* cited by examiner

*Primary Examiner* — Khoi Tran
*Assistant Examiner* — Abby Lin
(74) *Attorney, Agent, or Firm* — Sughrue Mion, PLLC (57) ABSTRACT

A map display system and method are provided. The display system includes a map information acquiring unit that acquires map information and a congestion level acquiring unit that acquires a congestion level for each road section within the map. The system also includes a route line display determining unit that determines whether a route line is displayed superimposed on any road line, the route line representing a planned travel route, each road line representing a road section within the map. The display is controlled such that if the route line is displayed superimposed on any road line a congestion line is displayed at a position by a first off-set distance from the road line on the display part and if the route line is not displayed superimposed on any road line, the congestion line is displayed at a second off-set distance from the road line on the display part.

6 Claims, 3 Drawing Sheets

MAP DISPLAY SYSTEM, METHOD, AND PROGRAM

INCORPORATION BY REFERENCE

This application claims priority from Japanese Patent Application No. 2011-155129, filed on Jul. 13, 2011, including the specification, drawings and abstract thereof, the disclosure of which is incorporated herein by reference in its entirety.

BACKGROUND OF THE INVENTION

1. Field of the Invention

Aspects of the present invention relate to a map display system, a method, and a program that display a map on a display part.

2. Description of the Related Art

Conventionally, a technology is known, which provides users with information of a current position, a planned travel route, and the like by displaying the map on the display part. In such map, a function that helps the users recognize a congestion level of each road section by drawing a road line representing a road section and a congestion line representing a congestion level on the map. In such a case, in order to prevent decreasing the visibility of the map due to the change in map scale, the map in which the road line and the congestion line are drawn, a technology is known which narrows a space between the road line and the congestion line as the scale becomes smaller (for example, refer to Japanese Patent Application; Publication No. JP-A-9-288796).

SUMMARY OF THE INVENTION

In the aforementioned technologies, the space between the road line and the congestion line is adjusted based on the scale. However, a technology that improves the visibility of the map, in which a route line representing a planned travel route is displayed, is not disclosed.

When displaying a map on the display part, the width of the road line is generally changed according to a road attribute and an actual road width. However, if the width of the route line is changed according to the road attribute, problems such as decreasing the visibility of the route line at a certain scale of the map could arise. Therefore, generally, the width of the route line is changed according to the scale, but not linked with the width of the road line. Consequently, when focusing on the map at a certain scale, road sections in which the width of the road line is larger than the width of the route line and road sections in which the width of the road line is larger than the width of the route line can exist in the same map. As a result, if the display position of the congestion line is determined in consideration of only the relation with the road line as in the conventional technologies, the congestion line may become overlapped with the route line. Thereby, the visibility of the congestion line and route line is decreased.

In light of the above problem, it is an aspect of the present invention to provide a technology to display a map with high visibility even if a route line is displayed.

In order to accomplish this aspect, in the present invention, the display position of the congestion line is determined using an off-set distance that varies between a case in which the route line is displayed superimposed on any road line, each road line representing a road section within the map, and a case in which the route line is not displayed superimposed on any road line. Specifically, if the route line is displayed superimposed on any road line, the map including the road line and the route line is displayed on the display part based on map information, a distance between the road line and the congestion line by which the route line is not overlapped with the congestion line representing the congestion level is determined as a first off-set distance, and the congestion line is displayed at a position by the first off-set distance from the road line on the display part. On the other hand, if the route line is not displayed superimposed on any road line, the map including the road line is displayed on the display part based on the map information, a distance between the road line and the congestion line by which the road line is not overlapped with the congestion line is determined as a second off-set distance, and the congestion line is displayed at a position by the second off-set distance from the road line on the display part. That is, when the route line is displayed in the map, the first off-set distance that is a distance between the road line and the congestion line is set such that the route line is not overlapped with the congestion line. On the other hand, if the route line is not displayed in the map, the second off-set distance that is a distance between the road line and the congestion line is set such that the road line is not overlapped with the congestion line.

Generally, in all scales displayable on the display part, the width of the road line does not always accord with the width of the route line in the map. Therefore, when the route line is displayed superimposed on the road line in the map, road sections in which the width of the road line is larger than the width of the route line and road sections in which the width of the road line is smaller than the width of the route line can occur at the same time. When displaying the route line in the map, if the first off-set distance is set such that the route line is not overlapped with the congestion line, the road line can be overlapped with the congestion line in the road sections where the width of the road line is larger than the width of the route line. However, the route line is not overlapped with the congestion line. Therefore, the route line and the congestion line can be displayed with high visibility. In addition, even if the road line is overlapped with the congestion line, the route line superimposing the road line indicates a road. Therefore, it is easy for the user to recognize the road line. Obviously, the route line is not overlapped with the congestion line in this case either. Therefore, the route line and the congestion line keep displayed with high visibility.

On the other hand, if the route line is not displayed in the map, it is not necessary to consider the route line. Therefore, if the second off-set distance is set such that the road line is not overlapped with the congestion line, it is possible to display such that the road line is not overlapped with the congestion line. Thereby, the road line and the congestion line can be displayed with high visibility.

Here, a map information acquiring unit may be used to acquire the map information indicating the map to be displayed on the display part, and the map information may be used to include the information required to display the map on the display part. That is, the map information includes information to determine the display positions of road lines (for example, information to indicate coordinates of ending points of road sections and connection relations of road sections). Obviously, the information to be required according to the drawing mode of the map can be previously defined as the map information. When the width of the road line is varied according to the road attribute and displayed, the information indicating the road attribute of each road section is included in the map information.

A congestion level acquiring unit may be used to acquire a congestion level for each road section within the map. Therefore, the information indicating a degree of congestion for each road section may be acquired through communication.

The congestion level may be acquired for all road sections within the map or part of the road sections within the map. A route line display determining unit may be used to determine whether the route line representing the planned travel route is displayed superimposed on any road line, each road line representing a road section within the map. The route line display determining unit may be used to determine at least whether the current status lies in a condition in which the route line is displayed superimposed on any road line.

A display controlling unit may be used to adjust the display position of the congestion line on the display part based on whether the route line is displayed superimposed on any road line and display the map. That is, the visibility of the map may be increased in either case by acquiring the first off-set distance that is an off-set distance when the route line is displayed superimposed on any road line, each road line representing a road section within the map, and the second off-set distance that is an off-set distance when the route line is not displayed superimposed on any road line, using different logic.

In addition, the first off-set distance and the second off-set distance may be used to indicate a distance between lines. Therefore, a distance in a direction parallel to the width direction between the center of one line in the width direction and the center of another line in the width direction may be determined as the off-set distance, for example. In addition, a distance may be defined by which the two lines each having its width are not overlapped as the off-set distance. Consequently, in order to define the off-set distance such that the two lines are not overlapped, the off-set distance by which the borders of the two lines contact and the two lines are not overlapped can be defined as a minimum value of the off-set distance and a value equal to or greater than the such minimum value can be defined as the off-set distance.

Further, as an example of practicing the map display system, it may be determined that the route line representing the planned travel route is displayed superimposed on any road line, each road line representing a road section within the map, if the planned travel route from the current position to the destination is being set. That is, the planned travel route from the current position to the destination is set in order to display the route line(s) from the current position to the destination in the map and perform route guidance. Consequently, if the planned travel route is being set, it can be considered that the route line(s) is displayed superimposed on the road line(s) representing the road section(s) corresponding to the planned travel route. By applying such configuration, it is not necessary to determine for all road lines representing the road sections within the map whether the route line is displayed superimposed on each road line. Therefore, it becomes possible to easily determine whether the route line is displayed.

Further, the congestion line may be displayed at a position by the first off-set distance from the road line for all road sections within the map if the route line is displayed superimposed on any road line. That is, the congestion line is displayed at a position by the first off-set distance from the road line for both the road line on which the route line is displayed superimposed and the road line on which the route line is not displayed superimposed. In such way, it is not necessary to determine for all road lines representing road sections within the map whether the route line is displayed superimposed on each road line. Therefore, it becomes possible to easily determine the display position of the congestion line.

Further, the map to be displayed on the display part may be displayed based on the map information. However, the width of the road line may vary depending on the scale. As an example in such case, the width of the road line may be determined according to the scale of the map and the road attribute of the road section represented by the road line and the width of the route line may be determined according to the scale of the map. That is, the width of the road line varies depending to the scale and the road attribute, and the width of the route line varies depending on the scale. In such case, the width of the route line is fixed in the map at one scale. However, the width of the road line varies depending on the road attribute. Therefore, the width of the road line and the width of the route line can differ in the same map. If the off-set distance between the road line and the congestion line is adjusted according to whether the route line is displayed, it is possible to display the map with high visibility even when the route line is displayed.

Further, the off-set distance may be determined such that the congestion line is not overlapped with other lines (the road line and the route line). Specifically, if the route line is displayed superimposed on any road line, a distance between the road line and the congestion line, the distance to display the congestion line at a position where the congestion line is not overlapped but contacts with a line of whichever has a larger width between the road line and the route line, is determined for each road section within the map, and such distance is acquired as the first off-set distance for each road section. Thereafter, the congestion line is displayed at a position by the first off-set distance, which corresponds to the road section represented by the road line, from the road line on the display part. In such configuration, it is possible to prevent that the congestion line is overlapped with other lines (the road line and route line) and to minimize the first off-set distance, which makes it possible to display the map without using an excessively-broad area to display the congestion line.

In addition, if the route line is not displayed superimposed on any road line, a distance between the road line and the congestion line, the distance to display the congestion line at a position where the congestion line is not overlapped but contacts with the road line, is determined for each road section within the map, and such distance is acquired as the second off-set distance for each road section. Thereafter, the congestion line is displayed at a position by the second off-set distance, which corresponds to the road section represented by the road line, from the road section on the display part. According to such configuration, it is possible to display the map such that there is no space between the congestion line and the road line.

Further, the technique of acquiring the off-set distance using different logic between a case in which the route line is displayed superimposed on the road line and a case in which the route line is not displayed superimposed on the road can be applied using a program and a method. In addition, it can be supposed that the system, the program, and the method as mentioned above are realized as a single device or a plurality of devices, or realized with parts used in common by the respective components provided in the vehicle. Various kinds of modes are included. For example, navigation systems, methods, and programs provided with the aforementioned devices can be supplied. Or, the structure can be changed as appropriate. For example, a part of the structure can be realized by software and another part by hardware. In addition, the invention can be practiced with a storage medium of a program that controls the system. Obviously, the storage medium of the software may be a magnetic storage medium or an optical storage medium. In addition, any storage medium to be developed in future can be applied in the same manner.

DETAILED DESCRIPTION OF THE EXEMPLARY EMBODIMENT

Figure 1:
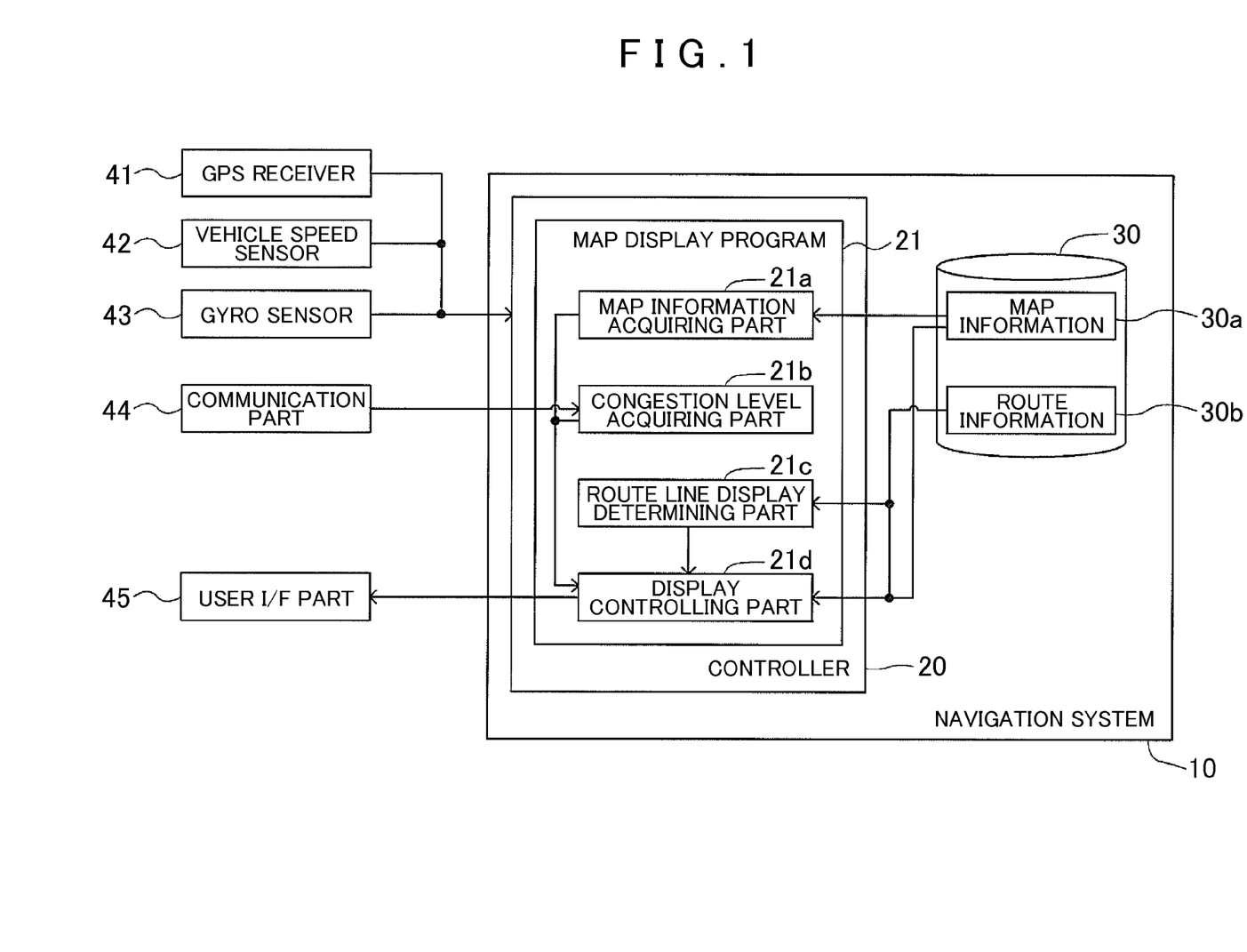
FIG. 1 is a block diagram of a navigation system including a map display system.

Here, exemplary embodiments of the present invention are explained in the following order.
(1) Configuration of navigation system
(2) Map display processing
(3) Other embodiments
(1) Configuration of Navigation System:

FIG. 1 is a block diagram showing the configuration of a navigation system 10 including a map display system according to the present invention. The navigation system 10 is provided with a controller 20 including a CPU, a RAM, a ROM, and the like, and a storage medium 30. Programs stored in the storage medium 30 and the ROM can be executed on the controller 20. In the present embodiment, a navigation program (not shown) can be executed as such program. The navigation program includes a map display program 21. The navigation program is a program module that causes the controller 20 to realize a function that provides guidance for a planned travel route from a current position of the vehicle to a destination. In addition, the map display program 21 is a program module that causes the controller 20 to display a map during the course in which the navigation program causes the controller 20 to realize respective functions.

A vehicle according to the present embodiment is provided with a GPS receiver 41, a vehicle speed sensor 42, a gyro sensor 43, a communication part 44, and a user I/F part 45. The controller 20 realizes functions by the navigation program using the respective parts as needed.

The GPS receiver 41 receives electronic waves from a GPS satellite and outputs information for calculating the current position of the vehicle through an interface (not shown). The controller 20 acquires these signals to acquire the current position of the vehicle. The vehicle speed sensor 42 outputs signals corresponding to a rotation speed of the wheels provided on the vehicle. The controller 20 acquires these signals through an interface (not shown) to acquire the current vehicle speed of the vehicle. The gyro sensor 43 outputs signals corresponding to an angular speed operated on the vehicle. The controller 20 acquires these signals through an interface (not shown) to acquire a travel direction of the vehicle. The vehicle speed sensor 42, the gyro sensor 43, and the like are utilized to correct the current position of the vehicle determined with the signals outputted by the GPS receiver 41, or the like. In addition, the current position of the vehicle is corrected based on the travel track of the vehicle as appropriate.

The communication part 44 is provided with a circuit to communicate with a congestion information management device (not shown) outside the vehicle. The controller 20 communicates with the congestion information management device through the communication part 44 to acquire congestion information indicating a congestion level of an arbitrary road section. In the present embodiment, the congestion information is information indicating a congestion level for each road section. The congestion level is classified in stages ("uncongested", "crowded", and "congested" in the order of a highest average speed first).

The user I/F part 45 is an interface part to supply various kinds of information to a user or to input instructions of the user. In the present embodiment, the user I/F part 45 is provided with a display part including a touch panel display (not shown) and a speaker to output audio. The controller 20 outputs control signals to the user I/F part 45 to display an arbitrary image on the display part and outputs an arbitrary audio from the speaker. In addition, the controller 20 determines contents instructed by the user based on the signals outputted by the user I/F part 45.

The storage medium 30 stores map information 30*a*. The map information 30*a* includes node data indicating nodes set to roads to be traveled by the vehicle, shape interpolating point data for determining shapes of roads between nodes, link data indicating links between nodes, data indicating positions of features existing on roads and their vicinity, and the like. In the present embodiment, the links having nodes at the both ends indicate the road sections. In addition, in the present embodiment, a road attribute is previously designated to each road section. In the present embodiment, the road attribute includes a narrow road, a general road, and a highway.

The controller 20, by the processing of the navigation program, refers to the map information 30*a* in response to an instruction by the user, calculates a route from the current position of the vehicle to the destination, and acquires the calculated route as a planned travel route. In addition, the controller 20 records the information indicating the planned travel route as route information 30*b* in the storage medium 30. Further, the controller 20, by the processing of the navigation program, determines the current position of the vehicle based on signals outputted from the GPS receiver 41, the vehicle speed sensor 42, and the gyro sensor 43. If the planned travel route is being set, the controller 20, by the processing of the navigation program, performs route guidance such that the vehicle could travel along the planned travel route.

In order to provide guidance for the current position and the route, the controller 20 displays the map on the display part of the user I/F part 45. The map display program 21 is executed when displaying the map. To display the map, the map display program 21 is provided with a map information acquiring part 21*a*, a congestion level acquiring part 21*b*, a route line display determining part 21*c*, and a display controlling part 21*d*.

The map information acquiring part 21*a* is a program module that causes the controller 20 to realize a function that acquires the map information 30*a* by referring to the storage medium 30. The congestion level acquiring part 21*b* is a program module that causes the controller 20 to realize a function that acquires congestion information through the communication part 44 and acquires the congestion level for each road section within the map based on the congestion information.

The route line display determining part 21*c* is a program module that causes the controller 20 to realize a function that determines whether the route line is displayed superimposed on any road line, the route line representing a planned travel route, each road line representing a road section within the map. The determination is only necessary to determine whether the route line is displayed superimposed on any road line. Therefore, in the present embodiment, if the aforementioned planned travel route is already set by the processing of the navigation program, the controller 20 determines that the route line is displayed superimposed on any road line, the route line representing the planned travel route, each road line representing a road section within the map. That is, the planned travel route from the current position to the destination is set to perform route guidance while displaying the route line(s) from the current position to the destination. Consequently, if the planned travel route(s) is being set, it is possible to recognize that the route line(s) is displayed superimposed on the road line(s) representing the road section(s) corresponding to the planned travel route. In the present embodiment, if the planned travel route is already set, it is determined that the route line is displayed superimposed on any road line, the route line representing the planned travel route, each road line representing a road section within the map. As a result, it is not necessary to determine for all road lines representing the road sections within the map whether the route line is displayed superimposed on each road line. Therefore, it becomes possible to easily determine whether the route line is displayed.

The display controlling part 21d is a program module that causes the controller 20 to realize a function that displays the map by adjusting the display position of the congestion line on the display part based on whether to display the route line superimposed. The controller 20 in the present embodiment acquires a first off-set distance and a second off-set distance using different logic. The first off-set distance is an off-set distance to be applied when the route line is displayed superimposed on any road line, each road line representing a road section within the map. The second off-set distance is an off-set distance to be applied when the route line is not displayed superimposed on any road line. The controller 20 sets the distance between the road line and the congestion line using one of the respective off-set distances, determines the display position of the congestion line, and displays the map on the display part.

Specifically, if the route line is displayed superimposed on any road line, the controller 20 displays the map including the road line and the route line on the display part based on the map information 30a by the processing of the display controlling part 21d. That is, the controller 20 determines the scale of the map previously designated by the user, determines the width of the road line according to the scale and the road attribute of each road section, and outputs to the user I/F part 45 control signals to display the road line representing each road section subject to display on the display part in the width corresponding to the road attribute. In addition, the controller 20 determines the width of the route line according to the scale of the map, refers to the route information 30b, and outputs to the user I/F part 45 control signals to display the route line superimposed on the road line in the determined width, the route line representing the planned travel route of the vehicle ahead of the current position. As a result, the map including the road line and the route line is displayed on the display part of the user I/F part 45.

In the map displayed in the aforementioned manner, the width of the road line on the map varies depending on the scale and the road attribute, and the width of the route line varies depending on the scale. Consequently, in the map at a certain scale, the width of the route line is constant while the width of the road line varies depending on the road attribute. Thus, the difference between the width of the road line and the width of the route line can vary in the same map. Therefore, in all scales displayable on the display part, it is not possible that the width of the road line always accords with the width of the route line on the map. The road sections where the width of the road line is larger than the width of the route line and the road sections where the width of the road line is smaller than the width of the route line can exist together. In the present embodiment, by adjusting the off-set distance between the road line and the congestion line according to whether to display the route line, a map with high visibility can be displayed even when displaying the route line.

That is, in the present embodiment, the controller 20 determines the first off-set distance, which is a distance between the road line and the congestion line by which the route line is not overlapped with the congestion line representing the congestion level, and displays the congestion line at a position by the first off-set distance from the road line on the display part. Here, the first off-set distance is only necessary to be set such that the route line is not overlapped with the congestion line. However, in the present embodiment, the controller 20 determines, for each road section within the map, a distance between the road line and the congestion line, the distance to display the congestion line at a position where the congestion line is not overlapped but contact with a line of whichever has a larger width between the road line and the route line, and acquires such distance as the first off-set distance for each road section.

When the first off-set distance is determined, the controller 20 sets the road section for which the congestion level is determined by the processing of the congestion level acquiring part 21b as the road section subject to display the congestion line. The controller 20, by the processing of the display controlling part 21d, outputs to the user I/F part 45 control signals to display the congestion line that is color-coded according to the congestion level at a position by the first off-set distance, which corresponds to the road section represented by the road line, from the road line for the road section subject to display the congestion line. As a result, in the map on the display part of the user I/F part 45, the congestion line is displayed at a position where the congestion line is not overlapped but contacts with the line of whichever has a larger width between the road line and the route line. According to the aforementioned configuration, it is possible to prevent that the congestion line is overlapped with other lines (the road line and route line), which makes it possible to display the map with high visibility. In addition, it is possible to minimize the first off-set distance, which makes it possible to display the map without using an excessively-broad area to display the congestion line.

On the other hand, if the route line is not displayed superimposed on any road line, the controller 20, by the processing of the display controlling part 21d, displays the map including the road line on the display part based on the map information 30a. That is, the controller 20 outputs to the user I/F part 45 control signals to display the road line representing each road section subject to display on the display part in the width corresponding to the road attribute. As a result, the map including the road line is displayed on the display part of the user I/F part 45. In this manner, the route line is not displayed on the displayed map. Therefore, the off-set distance of the congestion line may be set such that the visibility is not decreased due to the relation between the road line and the congestion line. The controller 20 determines, as the second off-set distance, a distance between the road line and the congestion line by which the road line is not overlapped with the congestion line and displays the congestion line at a position by the second off-set distance from the road line on the display part.

Here, the second off-set distance, which is the distance between the road line and the congestion line, may be set such that the road line is not overlapped with the congestion line. However, in the present embodiment, the controller 20 determines, for each road section within the map, a distance between the road line and the congestion line, the distance to display the congestion line at the position where the congestion line is not overlapped but contacts with the road line, acquires such distance as the second off-set distance for each road section, and displays the congestion line at a position by the second off-set distance, which corresponds to the road section represented by the road line, from the road line on the display part. That is, the controller 20 sets the road section for which the congestion level is determined by the processing of the congestion level acquiring part 21*b* as the road section subject to display the congestion line. The controller 20, by the processing of the display controlling part 21*d*, outputs to the user I/F part 45 control signals to display the congestion line that is color-coded according to the congestion level at a position by the second off-set distance, which corresponds to the road section represented by the road line, from the road line for the road section subject to display the congestion line. As a result, in the map on the display part of the user I/F part 45, the congestion line is displayed at a position where the congestion line is not overlapped but contacts with the road line. According to such configuration, it is possible to display the map such that there is no space between the congestion line and the road line, which makes it possible to display a map with high visibility.

Figure 2:
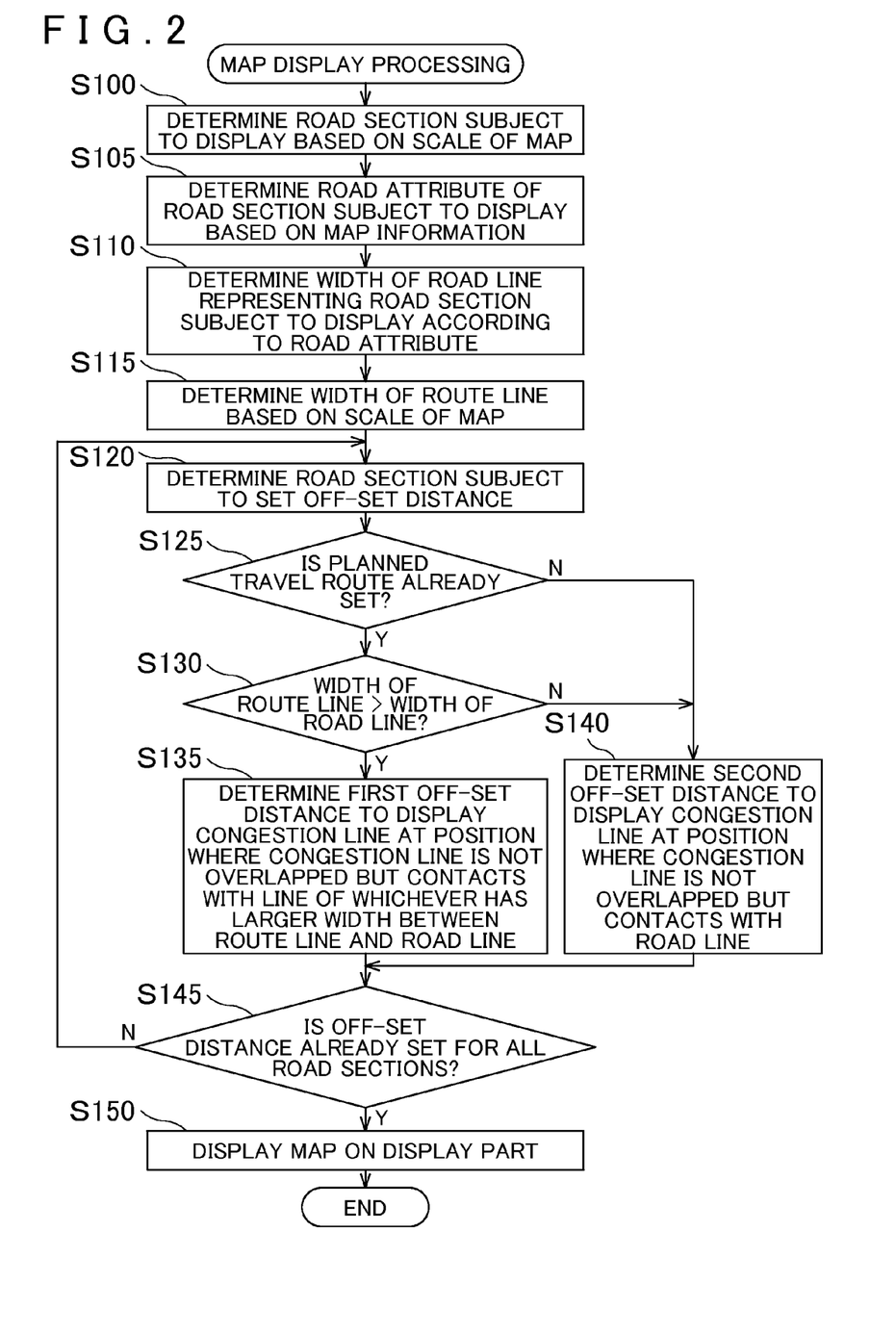
FIG. 2 is a flow chart showing map display processing.

(2) Map Display Processing:

Next, map display processing according to the present embodiment is explained in detail. FIG. 2 is a flow chart showing map display processing. When the navigation program is executed, the map display processing is also executed at predetermined time intervals (for example, 100 ms).

In the map display processing, the controller 20 determines road sections subject to display based on the scale of the map (Step S100). That is, the controller 20 determines an area of the map to be displayed on the display part when the controller 20, by the processing of the display controlling part 21*d*, displays on the display part a map at a scale previously designated by the user such that the current position of the vehicle is displayed at a predetermined position of the display part. In addition, the controller 20, by the processing of the map information acquiring part 21*a*, refers to the map information 30*a* regarding such area and determines the road sections included in such area as the road sections subject to display.

Figure 3A:
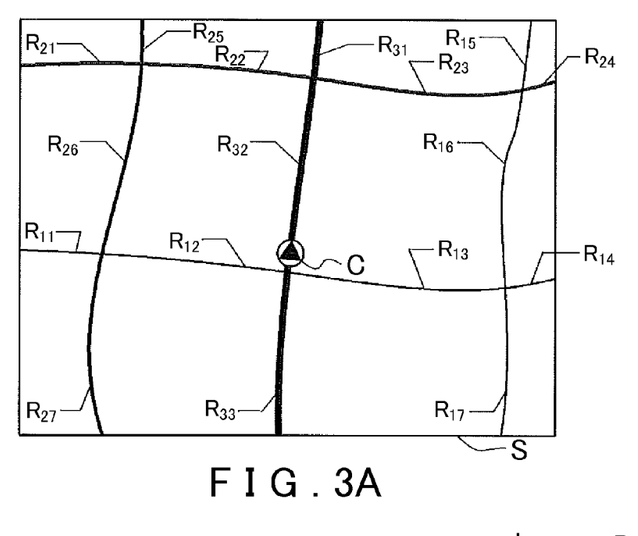
FIG. 3A shows an example of a map display.

FIG. 3A illustrates an example of the map to be displayed on a display screen S of the display part. In this example, C represents the current position of the vehicle and curve lines represent road lines representing road sections. When displaying such map on the display part, the controller 20 determines road sections $R_{11}$ to $R_{17}$, $R_{21}$ to $R_{27}$, and $R_{31}$ to $R_{33}$ as the road sections subject to display at Step S100.

Next, the controller 20 determines the road attributes of the road sections subject to display based on the map information (Step S105). That is, the controller 20, by the processing of the map information acquiring part 21*a*, refers to the map information 30*a* and determines the road attribute of each of the road sections subject to display that were determined at Step S100.

Next, the controller 20 determines widths of the road lines of the road sections subject to display for each road attribute (Step S110). In the present embodiment, the width of the road line is predetermined according to the scale of the map and the road attribute. The controller 20, by the processing of the display controlling part 21*d*, determines the scale of the map to be displayed on the display part and also determines the road attribute for each of the road sections subject to display. Thereafter, the controller 20 determines the width of the road line corresponding to the scale and the road attribute for each road section. In the present embodiment, the width of the road line is set to become larger in the order of a narrow road, a general road, and a highway, and also as the scale to display a narrower area map is set.

In the example shown in FIG. 3A, the road sections $R_{11}$ to $R_{17}$ correspond to narrow roads, the road sections $R_{21}$ to $R_{27}$ correspond to general roads, and the road sections $R_{31}$ to $R_{33}$ correspond to highways. In addition, in FIG. 3A, the road sections $R_{11}$ to $R_{17}$ are indicated by thin curve lines, the road sections $R_{31}$ to $R_{33}$ are indicated by thick lines, and the road sections $R_{21}$ to $R_{27}$ are indicated by lines thicker than the road sections $R_{11}$ to $R_{17}$ and thinner than $R_{31}$ to $R_{33}$. In any scale, the relation of road lines for the respective road attributes is similar to the example shown in FIG. 3A.

Next, the controller 20 determines the width of the route line based on the scale of the map (Step S115). In the present embodiment, the width of the route line is predetermined according to the scale of the map. The controller 20, by the processing of the display controlling part 21*d*, determines the scale of the map to be displayed on the display part. Thereafter, the controller 20 determines the width of the route line corresponding to the scale. As mentioned above, in the present embodiment, the width of the route line and the width of the road line are acquired using different logic and determined independently.

FIGS. 3B to 3J illustrate the relation between the road line, the route line, and the congestion line. In these figures, a road line R is indicated by a white line, a route line P is indicted by a hatched line, and a congestion line J is indicated by a thick dashed line. The route line P is indicated shorter than the road line R and the congestion line J so as to be easily recognized. The congestion line J is drawn at both sides of the road line R in a width direction to be defined for each travel direction of the road and indicate the congestion levels of opposite directions on two-way traffic road. The road lines R shown in FIGS. 3B, 3E, and 3H indicate narrow roads, the road lines R shown in FIGS. 3C, 3F, and 3I indicate general roads, and the road lines R shown in FIGS. 3D, 3G, and 3J indicate highways. In the present embodiment, the width of the route line and the width of the road line are acquired using different logic. Therefore, as shown in FIGS. 3B to 3G, depending on the road attribute, the sections where the width of the road line R is larger than the width of the route line P and the sections where the width of the road line R is smaller than the width of the route line P can exist together in one map.

When the width of the road line and the width of the route line are determined by the processing before Step S115, the controller 20, by the processing of the display controlling part 21*d*, determines the road section subject to set the off-set distance (Step S120). In the present embodiment, the off-set distance is set to each road section. Here, one road section to which the off-set distance is not being set is extracted from the road sections subject to display determined at Step S100, and is determined as being subject to set the off-set distance.

When the road section subject to set the off-set distance is determined, the controller 20, by the processing of the route line display determining part 21*c*, determines whether a planned travel route is already set (Step S125). That is, the controller 20 determines that the user has already set the planned travel route from the current position to the destination if the route information 30*b* indicating the planned travel route from the current position to the destination is recorded in the storage medium 30.

If it is not determined at Step S125 that the planned travel route is already set, the controller 20 recognizes that the route line is not displayed superimposed on any road line within the map. The controller 20, by the processing of the display controlling part 21*d*, determines the second off-set distance to display the congestion line at a position where the congestion line is not overlapped but contacts with the road line representing the road section for the road section subject to set the off-set distance (Step S140). The determined second off-set distance is associated with the road section subject to set the off-set distance.

Figure 3B:
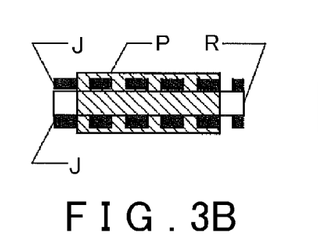
FIGS. 3B to 3J each illustrates a relation between a road line, a route line, and a congestion line.
Figure 3C:
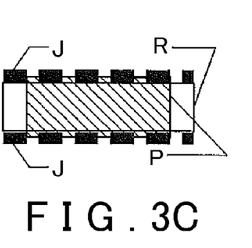
Figure 3D:
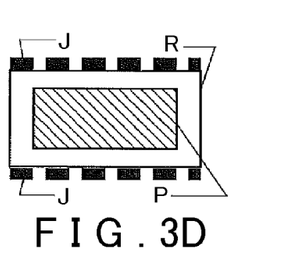
Figure 3E:
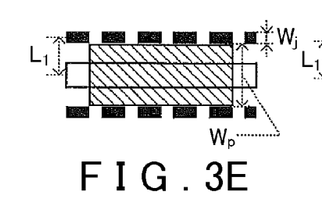
Figure 3F:
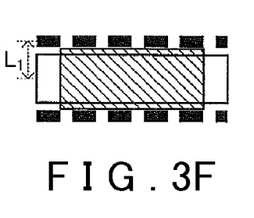
Figure 3G:
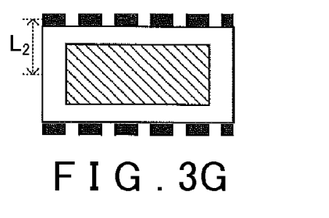
Figure 3H:
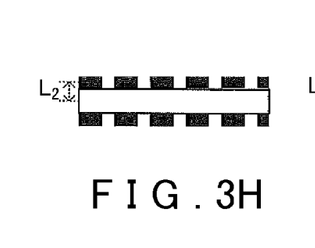
Figure 3I:
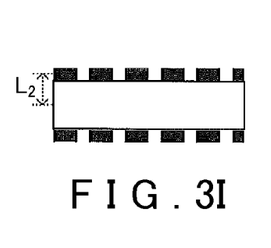
Figure 3J:
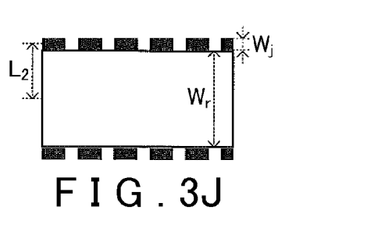

In the present embodiment, a distance in a direction parallel to the width direction between the center of one line in the width direction and the center of another line in the width direction is determined as the off-set distance. That is, the controller 20 determines a width Wr of the road line for each road section and a width Wj (a defined value) of the congestion line and sets (Wr/2)+(Wj/2) as the second off-set distance. If it is not determined at Step S125 that the planned travel route is already set, the route line is not displayed superimposed on any road line and the second off-set distance is associated with all road sections subject to display at Step S140. The road width Wr varies according to the road attribute of the road section. Therefore, the second off-set distance is defined as a value varying according to the width of the road line for each road section. In FIGS. 3H to 3J, the second off-set distance is indicated by $L_2$. In FIG. 3J, the width Wr of the road line and the width Wj of the congestion line are also indicated. If it is not determined at Step S125 that the planned travel route is already set, the second off-set distance L2 varies depending on the road section, as shown in FIGS. 3H to 3J.

On the other hand, if it is determined at Step S125 that the planned travel route is already set, the controller 20, by the processing of the display controlling part 21d, determines whether the width of the route line is larger than the width of the road line (Step S130). That is, the controller 20 compares the width of the route line determined at Step S115 with the width of the road line determined at Step S110. Among the examples shown in FIGS. 3E to 3G, FIGS. 3E and 3F indicate a state where the width of the route line is larger than the width of the road line, and FIG. 3G indicates a state where the width of the route line is smaller than the width of the road line.

If it is not determined at Step S130 that the width of the route line is larger than the width of the road line, the controller 20 executes Step S140 by the processing of the display controlling part 21d. That is, if it is not determined at Step S130 that the width of the route line is larger than the width of the road line, the controller 20 determines the off-set distance (the second off-set distance) for the road section subject to set the off-set distance focusing on the road line instead of the route line because the width of the route line is equal to the width of the road line or the width of the road line is larger than the width of the route line. Also, in this case, the determined second off-set distance is associated with the road section subject to set the off-set distance. FIG. 3G shows an example in which the width of the route line is smaller than the width of the road line. In such case, the off-set distance to determine the position of the congestion line is the second off-set distance $L_2$ shown in FIG. 3G.

On the other hand, it is determined at Step S130 that the width of the route line is larger than the width of the road line, the controller 20, by the processing of the display controlling part 21d, determines, for the road section subject to set the off-set distance, the first off-set distance to display the congestion line at a position where the congestion line is not overlapped but contacts with a line of whichever has a larger width between the road line and the route line (Step S135). The determined first off-set distance is associated with the road section subject to set the off-set distance.

Also, in this case, a distance in a direction parallel to the width direction between the center of one line in the width direction and the center of another line in the width direction is determined as the off-set distance. Therefore, the controller 20 determines a width Wp of the route line and the width Wj of the congestion line and sets (Wp/2)+(Wj/2) as the first off-set distance. If it is determined at Step S125 that the planned travel route is already set and it is determined at Step S130 that the width of the route line is larger than the width of the road line, the controller 20 determines the off-set distance (the first off-set distance) for the road section subject to set the off-set distance focusing on the route line instead of the road line because the route line is displayed superimposed on the road line in the road section subject to set the off-set distance and the road line is covered by the route line. In the present embodiment, the width of the route line is determined according to the scale of the map and the width of the route line does not vary in the same map. Therefore, if the width of the route line is larger than the width of the road line, the first off-set distance is defined as a value not varying depending on the road section. In FIGS. 3E and 3F, the first off-set distance is indicated by $L_1$. In FIG. 3E, the width Wp of the route line and the width Wj of the congestion line are indicated. As shown in FIGS. 3E and 3F, if the width of the route line is larger than the width of the road line, the first off-set distance does not vary even if the width of the road line varies.

Step S135 is executed if it is determined at Step S130 that the width of the route line is larger than the width of the road line. However, at Step S125, which is a condition for executing Step S130, it is determined whether the planned travel route is being set, but it is not determined whether the route line is displayed superimposed on the road line for each road section. Therefore, even if there is a road line on which the route line is not displayed superimposed within the map, the first off-set distance is determined for the road section representing such road line at Step S135. Consequently, the congestion line is displayed at a position by the first off-set distance from the road line for such road section. However, by applying this configuration, it is not necessary to determine for all road lines representing the road sections within the map whether the route line is displayed superimposed on each road line. Thereby, it is possible to easily determine the display position of the congestion line.

If the off-set distance is determined for the road section subject to set the off-set distance at Step S135 or S140, the controller 20, by the processing of the display controlling part 21d, determines whether the off-set distance is already set for all road sections subject to display (Step S145). If it is not determined that the off-set distance is already set for all road sections subject to display, the controller 20 repeats the processing subsequent to Step S120. That is, the controller 20 sets the road section for which the off-set distance is not set yet as the road section subject to set the off-set distance and executes the processing to determine the off-set distance.

On the other hand, if it is determined at Step S145 that the off-set distance is already set for all road sections, the controller 20 displays the map on the display part (Step S150). That is, the controller 20, by the processing of the congestion level acquiring part 21b, sends a request to acquire the congestion levels for the road sections subject to display to the congestion information management device using the communication part 44. If the congestion information is sent from the congestion information management device upon the request, the controller 20 acquires the congestion information via the communication part 44. If the congestion information is acquired, the controller 20 determines the congestion level of the road section associated with the congestion information. If the congestion information is not acquired, the congestion line is not displayed.

Further, the controller 20, by the processing of the display controlling part 21d, refers to the map information 30a, determines the positions of the nodes of the road sections subject to display, and also determines the drawing positions of the road lines connecting the positions of the nodes based on the connection relation between the nodes indicated by the link data. In addition, the controller 20 acquires the width of the road line for each of the road sections determined at Step S110 and outputs control signals to draw the road line at the drawing position in such width to the display part of the user I/F part 45. As a result, the road line is displayed on the display part.

If the planned travel route is already set, the controller 20, by the processing of the display controlling part 21d, determines the road section on which the route line should be displayed superimposed, based on the route information 30b. Further, the controller 20 acquires the width of the route line determined at Step S115 and outputs control signals to display the route line in such width superimposed on the road section subject to be superimposed to the display part of the user I/F part 45. As the result, the route line is displayed superimposed on the road line on the display part.

Further, the controller 20, by the processing of the display controlling part 21d, acquires the off-set distance associated with the road section at Step S135 or S140 for the road section for which the congestion information was acquired. In addition, the controller 20 acquires the congestion level of the road section and the width (a predefined value) of the congestion line, and outputs control signals to draw the congestion line in a color corresponding to the congestion level at a position by the off-set distance from the center in the width direction of the road line representing the road section, for which the congestion information was acquired, to the display part of the user I/F part 45. As a result, the congestion line is displayed at a position by the off-set distance from the road line on the display part.

By the aforementioned processing, if the route line is displayed superimposed on the road line, the congestion line is displayed in accordance with the border of whichever has a larger width between the road line and the route line. For example, the width of the route line is larger than the width of the road line for narrow roads and the width of the road line for general roads and smaller than the width of the road line for highways. In case of narrow roads and general roads, the congestion line is displayed so as to contact the route line as shown in FIG. 3E and in FIG. 3F, respectively. On the other hand, in case of highways, the congestion line is displayed so as to contact the road line as shown in FIG. 3G. As the conventional technology, when the position of the congestion line is determined only focusing on the relation between the road line and the congestion line without considering the route line displayed superimposed on the road line, if the width of the road line is larger than the route line, the lines are not overlapped even when the congestion line contacting the road line is displayed as shown in FIG. 3D. Therefore, the visibility is not decreased. However, if the width of the route line is larger than the width of the road line, the route line and the congestion line can be overlapped as shown in FIGS. 3B and 3C. Therefore, the visibility is decreased. However, in the present embodiment, the congestion line is displayed in accordance with the border of whichever has a larger width between the road line and the route line. Therefore, the lines are not overlapped as shown in FIGS. 3E and 3G. Thus, the visibility is not decreased.

(3) Other Embodiments

The aforementioned embodiment is an example to realize the present invention. Therefore, other kinds of embodiments can be applied, provided that the off-set distance is acquired using different logics between a case in which the route line is displayed superimposed on the road line and a case in which the route line is not displayed superimposed on the road line.

In the aforementioned embodiment, it is directly determined whether the planned travel route from the current position to the destination is being set, and if the planned travel route is being set, it is determined that the route line representing the planned travel route is displayed superimposed on any road line, each road line representing a road section within the map. However, it may be indirectly determined that the planned travel route is being set. For example, if the route guidance based on the planned travel route is being performed, it may be determined that the planned travel route is being set and the route line representing the planned travel route is displayed superimposed on any road line, each road line representing a road section within the map.

Further, the navigation system may be realized by a plurality of devices. That is, the respective units to be realized by the map display program 21 are separately installed in a plurality of devices, and the transmission of information between separate devices may be realized through communication. Obviously, a part of each unit may be installed in one device, and another part in another device.

Further, the first off-set distance is only necessary to be set such that the route line is not overlapped with the congestion line if the route line is displayed in the map. Therefore, the road line may be overlapped with the congestion line. For example, the off-set distance by which the congestion line is not overlapped but contacts with the route line may be set as the minimum value of the off-set distance and a value equal to or greater than the minimum value may be defined as the off-set distance.

In such case, the road line can be overlapped with the congestion line in road sections where the width of the road line is larger than the width of the route line. However, the route line is not overlapped with the congestion line. Therefore, the route line and the congestion line are displayed with high visibility. In addition, even if the road line is overlapped with the congestion line, the route line superimposing the road line indicates a road. Therefore, it is easy for the user to recognize the road line. Obviously, also in this case, the route line is not overlapped with the congestion line. Therefore, the route line and the congestion line keep displayed with high visibility.

While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

What is claimed is:

1. A map display system comprising:
   at least one hardware processor that implements:
   a map information acquiring unit that acquires map information indicating a map to be displayed on a display part;
   a congestion level acquiring unit that acquires a congestion level for each road section within the map;
   a route line display determining unit that determines whether a route line is displayed superimposed on any road line, the route line representing a planned travel route, each road line representing a road section within the map; and
   a display controlling unit that, if the route line is displayed superimposed on any road line, displays, based on the map information, the map including the road line and the route line on the display part, determines whether a width of the route line is larger than a width of the road line, and if the width of the route line is larger than the width of the road line, displays a congestion line at a position by a first off-set distance from the road line on the display part, the congestion line representing the congestion level, the first off-set distance being a distance between the road line and the congestion line by which the route line is not overlapped with the congestion line, if the route line is not displayed superimposed on any road line, displays, based on the map information, the map including the road line on the display part and displays the congestion line at a position by a second off-set distance from the road line on the display part, the second off-set distance being a distance between the road line and the congestion line by which the road line is not overlapped with the congestion line, and if the route line is displayed superimposed on any road line and the width of the route line is not larger than the width of the road line, displaying the congestion line at a position by a second off-set distance from the road line on the display part.

2. The map display system according to claim 1, wherein if a planned travel route from a current position to a destination is being set, the route line display determining unit determines that the route line is displayed superimposed on any road line; and if the route line is displayed superimposed on any road line, the display controlling unit displays the congestion line at a position by the first off-set distance from the road line for all road sections within the map.

3. The map display system according to claim 1, wherein a width of the road line is determined according to a scale of the map and a road attribute of the road section represented by the road line, and a width of the route line is determined according to the scale of the map.

4. The map display system according to claim 1, wherein the display controlling unit, if the route line is displayed superimposed on any road line, determines, for each road section within the map, a distance between the road line and the congestion line, the distance to display the congestion line at a position where the congestion line is not overlapped but contacts with a line of whichever has a larger width between the road line and the route line, acquires such distance as the first off-set distance for each road section, and displays the congestion line at a position by the first off-set distance, which corresponds to the road section represented by the road line, from the road line on the display part; and if the route line is not displayed superimposed on any road line, determines, for each road section within the map, a distance between the road line and the congestion line, the distance to display the congestion line at a position where the congestion line is not overlapped but contacts with the road line, acquires such distance as the second off-set distance for each road section, and displays the congestion line at a position by the second off-set distance, which corresponds to the road section represented by the road line, from the road line on the display part.

5. A map display method, comprising the steps of:

acquiring map information indicating a map to be displayed on a display part;

acquiring a congestion level for each road section within the map;

determining whether a route line is displayed superimposed on any road line, the route line representing a planned travel route, each road line representing a road section within the map; and if the route line is displayed superimposed on any road line, displaying, based on the map information, the map including the road line and the route line on the display part, deter whether a width of the route line is larger than a width of the road line, and if the width of the route line is larger than the width of the road line, displaying a congestion line at a position by a first off-set distance from the road line on the display part, the congestion line representing the congestion level, the first off-set distance being a distance between the road line and the congestion line by which the route line is not overlapped with the congestion line, if the route line is not displayed superimposed on any road line, displaying, based on the map information, the map including the road line on the display part and displaying the congestion line at a position by a second off-set distance from the road line on the display part, the second off-set distance being a distance between the road line and the congestion line by which the road line is not overlapped with the congestion line, and if the route line is displayed superimposed on any road line and the width of the route line is not larger than the width of the road line, displaying the congestion line at a position by a second off-set distance from the road line on the display part.

6. A map display program stored on a non-transitory computer readable medium causing a computer to execute the functions of:

acquiring map information indicating a map to be displayed on a display part;

acquiring a congestion level for each road section within the map;

determining whether a route line is displayed superimposed on any road line, the route line representing a planned travel route, each road line representing a road section within the map; and if the route line is displayed superimposed on any road line, displaying, based on the map information, the map including the road line and the route line on the display part, determining whether a width of the route line is larger than a width of the road line, and if the width of the route line is larger than the width of the road line, displaying a congestion line at a position by a first off-set distance from the road line on the display part, the congestion line representing the congestion level, the first off-set distance being a distance between the road line and the congestion line by which the route line is not overlapped with the congestion line, if the route line is not displayed superimposed on any road line, displaying, based on the map information, the map including the road line on the display part and displaying the congestion line at a position by a second off-set distance from the road line on the display part, the second off-set distance being a distance between the road line and the congestion line by which the road line is not overlapped with the congestion line, and if the route line is displayed superimposed on any road line and the width of the route line is not larger than the width of the road line, displaying the congestion line at a position by a second off-set distance from the road line on the display part.

\* \* \* \* \*